(12) United States Patent
Watanabe

(10) Patent No.: US 8,767,262 B2
(45) Date of Patent: Jul. 1, 2014

(54) IMAGE PROCESSING DEVICE DETERMINING MOSQUITO NOISE

(71) Applicant: Toshihiro Watanabe, Kuwana (JP)

(72) Inventor: Toshihiro Watanabe, Kuwana (JP)

(73) Assignee: Brother Kogyo Kabushiki Kaisha, Nagoya, Aichi (JP)

( * ) Notice: Subject to any disclaimer, the term of this patent is extended or adjusted under 35 U.S.C. 154(b) by 27 days.

(21) Appl. No.: 13/689,032

(22) Filed: Nov. 29, 2012

(65) Prior Publication Data

US 2013/0135639 A1 May 30, 2013

(30) Foreign Application Priority Data

Nov. 29, 2011 (JP) ................................. 2011-260053

(51) Int. Cl.
*H04N 1/60* (2006.01)

(52) U.S. Cl.
USPC ............... 358/1.9; 375/240.24; 375/240.27; 382/260; 382/266; 382/268; 382/274; 382/275

(58) Field of Classification Search
None
See application file for complete search history.

(56) References Cited

U.S. PATENT DOCUMENTS

| | | | | |
|---|---|---|---|---|
| 5,479,211 A | * | 12/1995 | Fukuda | ..................... 375/240.03 |
| 7,031,546 B2 | * | 4/2006 | Maeda et al. | ................. 382/260 |
| 7,409,103 B2 | * | 8/2008 | Nishi et al. | ..................... 382/275 |
| 7,415,163 B2 | * | 8/2008 | Nishi et al. | ..................... 382/275 |
| 7,734,089 B2 | * | 6/2010 | Zhang et al. | .................. 382/181 |
| 8,189,946 B2 | * | 5/2012 | Ohira | ............................ 382/266 |
| 8,351,739 B2 | * | 1/2013 | Lee et al. | ....................... 382/275 |
| 2005/0117807 A1 | * | 6/2005 | Shohdohji | ..................... 382/233 |
| 2006/0104538 A1 | * | 5/2006 | Izumi | ........................... 382/275 |
| 2008/0085059 A1 | * | 4/2008 | Chao et al. | .................... 382/260 |

FOREIGN PATENT DOCUMENTS

| | | |
|---|---|---|
| JP | 2002-262114 A | 9/2002 |
| JP | 2009-017392 A | 1/2009 |

* cited by examiner

*Primary Examiner* — Dung Tran
(74) *Attorney, Agent, or Firm* — Scully, Scott, Murphy & Presser, PC

(57) ABSTRACT

In an image processing device, the processor performs: (a) setting, as target pixel data, each set of pixel data; (b) selecting, from among the plurality of sets of pixel data, a plurality of first sets of pixel data corresponding to a plurality of first pixels positioned within a prescribed range of the image; (c) determining whether the plurality of first sets of pixel data represents a white background; (d) determining whether a variation in color difference components among the plurality of first sets of pixel data satisfies a prescribed condition; and (e) determining that target pixel data includes mosquito noise when the plurality of first sets of pixel data represents the white background and when the variation in the color difference component among the plurality of first sets of pixel data satisfies the prescribed condition. The prescribed range includes a pixel corresponding to the target pixel data.

11 Claims, 10 Drawing Sheets

IMAGE PROCESSING DEVICE DETERMINING MOSQUITO NOISE

CROSS REFERENCE TO RELATED APPLICATION

This application claims priority from Japanese Patent Application No. 2011-260053 filed Nov. 29, 2011. The entire content of the priority application is incorporated herein by reference.

TECHNICAL FIELD

The present invention relates to an image processing device employing a technique to process image data that has been compressed using lossy compression.

BACKGROUND

Conventionally, image processing devices have expanded image data compressed according to JPEG compression, for example, outputting an image in some form based on the expanded image data. One example of this type of image processing device is a printer or other image-forming device that first expands compressed image data and then prints an image on paper based on the expanded image data.

SUMMARY

Some processes for compressing image data employ lossy compression in order to improve the compression ratio. In lossy compression, a portion of the image data is irreversibly lost at the time of compression. As an example, JPEG compression includes a quantization process for eliminating high-frequency components obtained with a discrete cosine transform. Since this method cannot properly render sharp changes in an image, image data obtained by expanding the compressed image will sometimes include mosquito noise around edges in the image, such as along the borders of characters and lines. In the case of JPEG compression, some conventional image processing devices perform processes to detect edges within image data for a plurality of pixels and to determine whether mosquito noise exists near pixel data corresponding to the detected edges.

However, since mosquito noise is generated within a block of data to which a discrete cosine transform is applied, mosquito noise may also be produced in pixel data corresponding to parts of an image separated from edges depending on the image data. Therefore, mosquito noise may be produced in pixel data corresponding to parts of the image separated from edges due to the relationship between the size of block of image data treated in the compression process, and the size of regions subjected to the process to detect mosquito noise. By performing processes to detect mosquito noise only near pixel data corresponding to edges, the conventional image processing devices sometimes fail to detect mosquito noise in the above cases.

In view of the foregoing, it is an object of the present invention to provide an image processing device for processing image data that was compressed according to lossy compression and for detecting mosquito noise in the image data with accuracy.

In order to attain the above and other objects, the invention provides an image processing device includes an input portion and a processor. The input portion is configured to input image data expanded from compressed image data. The image data represents an image having a plurality of pixels. The image data includes a plurality of sets of pixel data corresponding the plurality of pixels. Each of the plurality of sets of pixel data includes a color difference component and a luminance component. The processor configured to perform: (a) setting, as target pixel data, each set of pixel data from among the plurality of sets of pixel data; (b) selecting, from among the plurality of sets of pixel data, a plurality of first sets of pixel data corresponding to a plurality of first pixels positioned within a prescribed range of the image, the prescribed range including a pixel corresponding to the target pixel data; (c) determining whether the plurality of first sets of pixel data represents a white background having a density lower than a prescribed density by at least one luminance component of the plurality of first sets of pixel data; (d) determining whether a variation in color difference components among the plurality of first sets of pixel data satisfies a prescribed condition; and (e) determining that target pixel data includes mosquito noise when the plurality of first sets of pixel data represents the white background and when the variation in the color difference component among the plurality of first sets of pixel data satisfies the prescribed condition.

BRIEF DESCRIPTION OF THE DRAWINGS

The particular features and advantages of the invention as well as other objects will become apparent from the following description taken in connection with the accompanying drawings, in which.

DETAILED DESCRIPTION

First Embodiment

Next, a first embodiment of the present invention will be described while referring to FIGS. 1 through 8.

1. Structure of a Multifunction Peripheral

Figure 1:
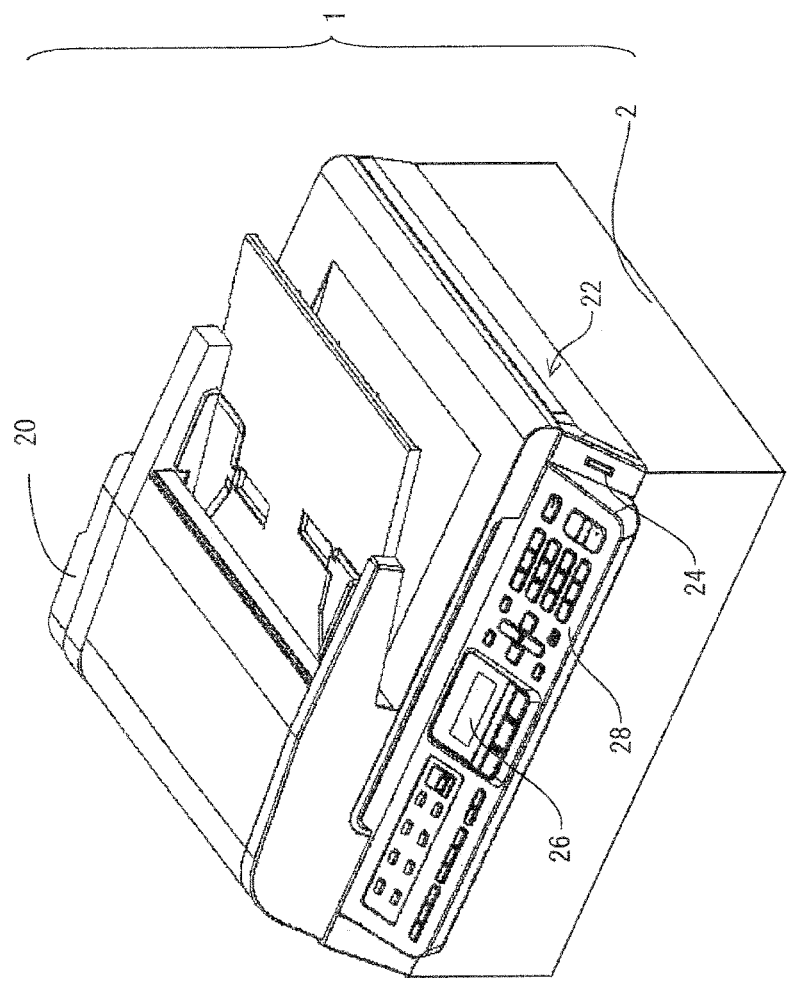
FIG. 1 is a perspective view showing an overall structure of a multifunction peripheral (MFP) according to a first embodiment.

FIG. 1 is a perspective view showing the overall structure of a multifunction peripheral (MFP) 1. The MFP 1 according to the embodiment includes a device body 2, and an image-reading unit 20 disposed on top of the device body 2. An image-forming unit 22 is built into the device body 2. The image-forming unit 22 prints images of an original document scanned by the image-reading unit 20. Provided on the front surface of the MFP 1 are a USB interface 24, a display unit 26 configured of a liquid crystal display, and an operating unit 28 having a set of buttons that includes a Start key, a Stop key, and a numerical keypad.

Figure 2:
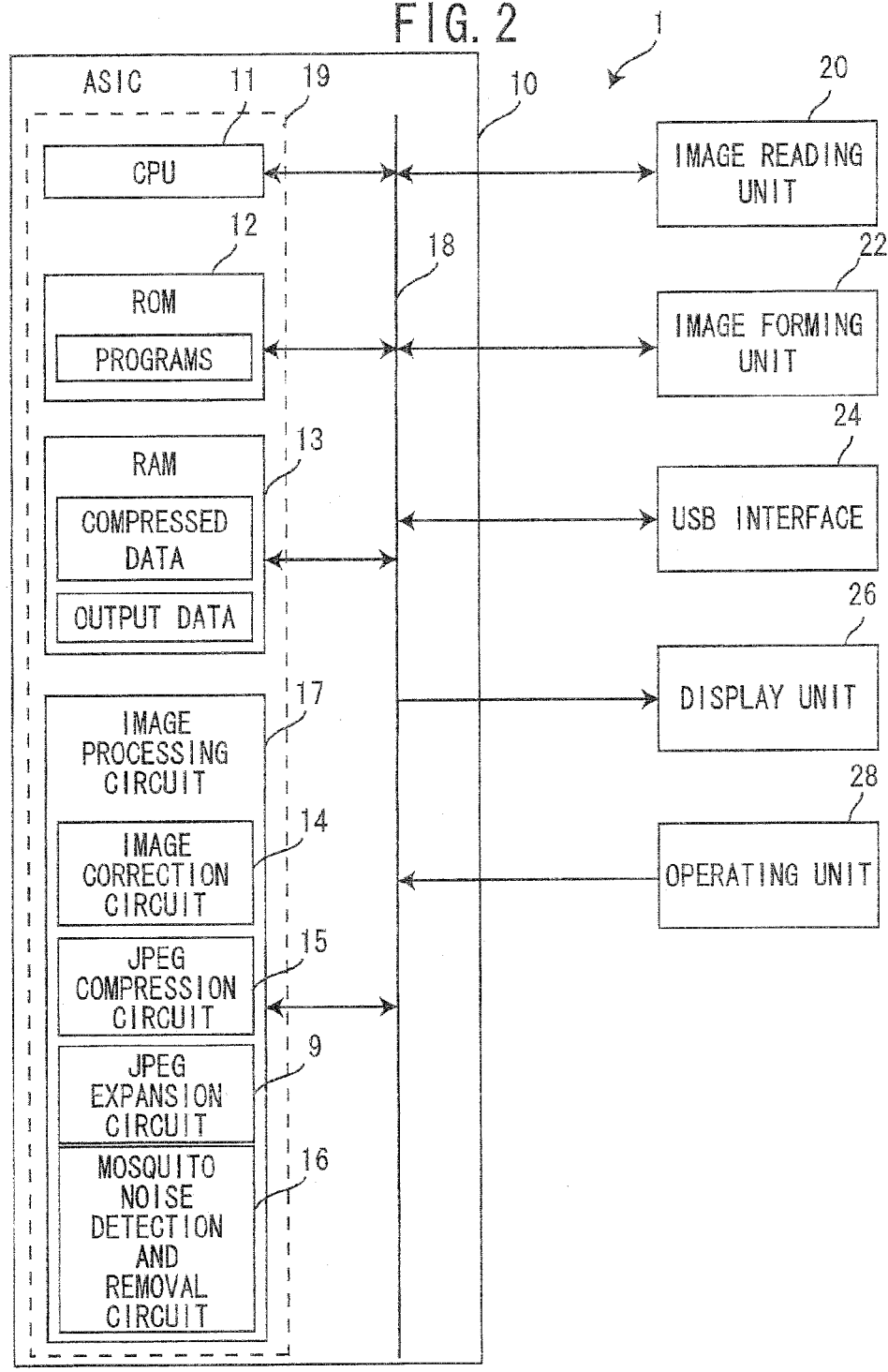
FIG. 2 is a block diagram showing a general electrical structure of the MFP.

FIG. 2 is a block diagram showing the general electrical structure of the MFP 1. As shown in FIG. 2, the MFP 1 further includes an application-specific integrated circuit (ASIC) 10 for controlling the components of the MFP 1. The image-reading unit 20 scans an original document or the like and stores the scanned image data in a RAM 13 (described later) after the image data is compressed in the JPEG format using a JPEG compression circuit 15 (described later). Here, the scanned image data represents an image of the original document. The USB interface 24 serves to connect the MFP 1 to an external device, such as USB memory.

A JPEG expansion circuit 9 (described later) expands image data that was read by the image-reading unit 20 and compressed in the JPEG format or compressed JPEG image data stored in USB memory, and the image-forming unit 22 forms images on recording media based on the expanded image data. Alternatively, when the user inputs a command via the operating unit 28 to display an image, the JPEG expansion circuit 9 (described later) expands image data that was read by the image-reading unit 20 and compressed in the JPEG format or compressed JPEG image data stored in USB memory, and the expanded JPEG image may be displayed on the display unit 26.

The ASIC 10 includes a central processing unit (CPU) 11, a ROM 12, a RAM 13, and an image-processing circuit 17 that are all connected to the image-reading unit 20, the image-forming unit 22, the USB interface 24, and the like via a bus 18. A component set 19 that includes the CPU 11, ROM 12, RAM 13, and image-processing circuit 17 of the ASIC 10 constitutes the control unit of the embodiment.

The ROM 12 stores various programs used to control operations of the MFP 1. The CPU 11 controls the components of the MFP 1 according to the programs read from the ROM 12. For example, the CPU 11 controls the image-reading unit 20 to scan an original document or the like, controls the image-processing circuit 17 to execute various processes on image data D, and controls the image-forming unit 22 to form images on printing media.

The image-processing circuit 17 includes an image correction circuit 14, a JPEG compression circuit (hereinafter simply referred to as "compression circuit") 15, a JPEG expansion circuit (hereinafter simply referred to as "expansion circuit") 9, and a mosquito noise detection and removal circuit (hereinafter simply referred to as "detection and removal circuit") 16.

Figure 3:
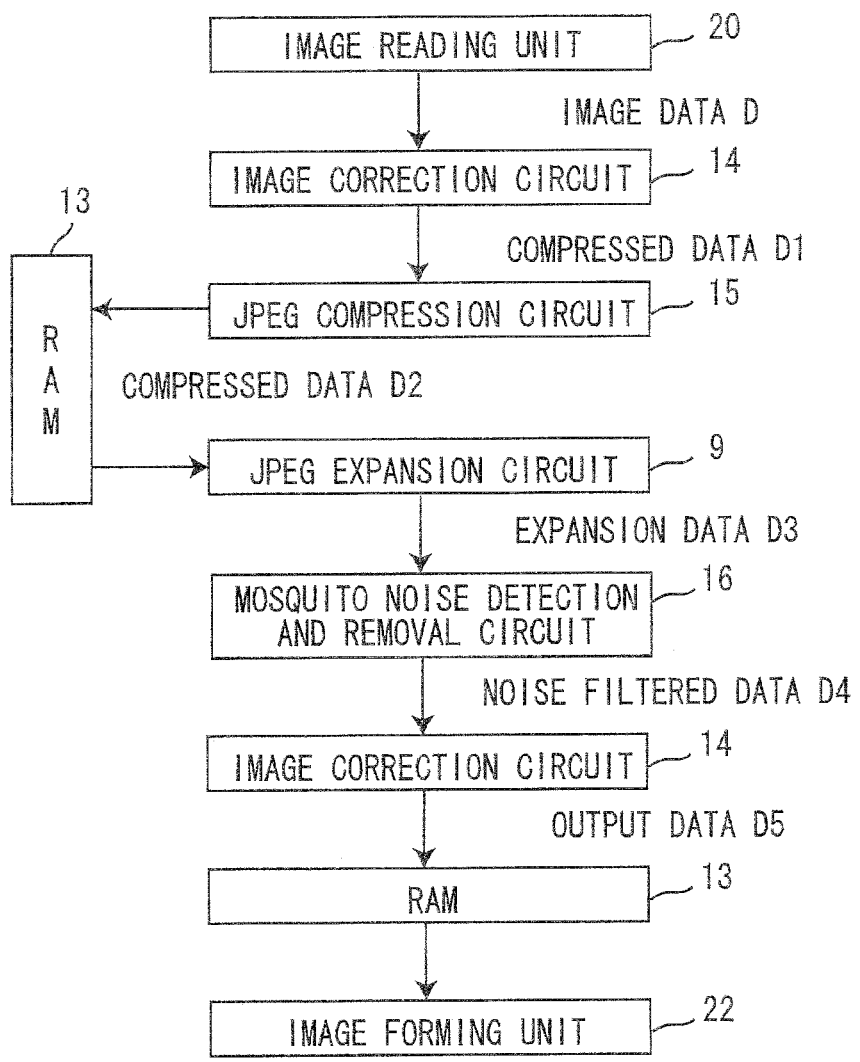
FIG. 3 is an explanatory diagram illustrating a process in which an image-reading unit reads image data and an image-forming unit forms an image on an recording medium based on the image data.

FIG. 3 is a flowchart illustrating steps in an operation performed on the MFP 1 from the image-reading unit 20 scanning the image data D to the image-forming unit 22 forming an image on a printing medium based on the image data D. The image correction circuit 14 also performs processes to correct the image data D produced by the image-reading unit 20.

After performing various corrections on the image data D, the image correction circuit 14 outputs corrected data D1. The compression circuit 15 generates compressed data D2 by compressing the corrected data D1 in the JPEG format. This compressed data D2 is stored in the RAM 13. Subsequently, the expansion circuit 9 generates expanded data D3 by expanding the compressed data D2 stored in the RAM 13. The detection and removal circuit 16, which will be described later in greater detail, filters noise from the expanded data D3 to produce noise-filtered data D4. The image correction circuit 14 then performs various correction processes on the noise-filtered data D4. The output data D5 produced by the image correction circuit 14 is stored in the RAM 13. The image-forming unit 22 forms an image on a printing medium based on the output data D5 stored in the RAM 13.

Figure 4:
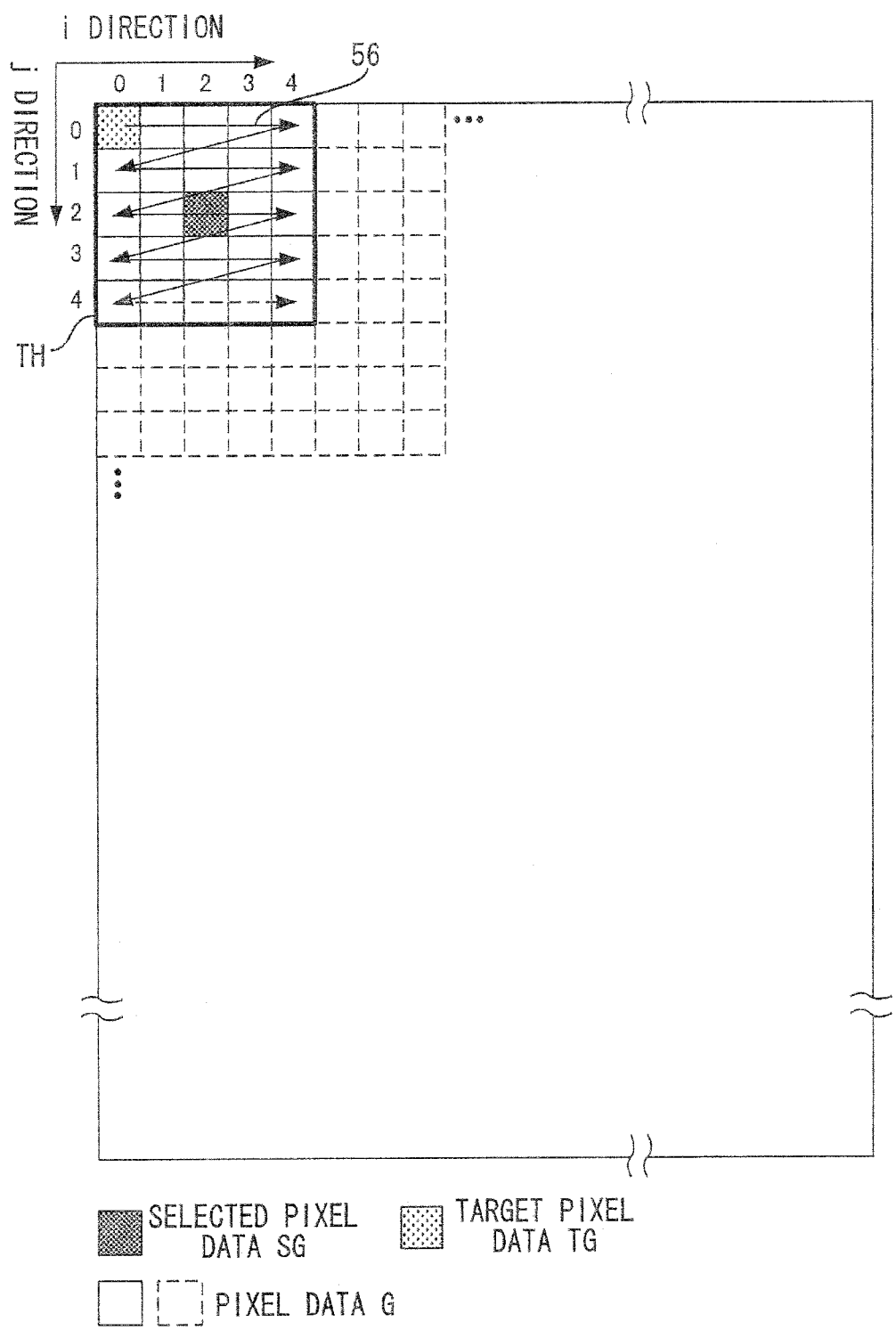
FIG. 4 is an explanatory diagram illustrating image data configured of a plurality of pixel data and an block used in JPEG compression and expansion process.

As shown in FIG. 4, the image data D is configured of set of pixel data G for each of a plurality of pixels. That is, the image data D represents an image having a plurality of pixels and the pixel data G corresponds to one of the plurality of pixels. The units of pixel data G are arranged in rows aligned with a direction i, and columns aligned in a direction j orthogonal to the direction i. Each unit of pixel data G includes a Y component (the luminance component), and Cb and Cr components (the color difference components). When compressing or expanding the image data D according to the JPEG format, the compression circuit 15 or the expansion circuit 9 process the pixel data G in 8×8 pixels as unit block, as shown in FIG. 4.

In JPEG image compression, the compression circuit 15 uses a discrete cosine transform (hereinafter DCT) to convert the pixel data G included in the block being processed to frequency data. The frequency data obtained from this conversion is then quantized to discard high-frequency components. Next, the compression circuit 15 produces the compressed data D2 according to JPEG compression using Huffman coding or another entropy encoding algorithm, and stores the compressed data D2 in the RAM 13.

For JPEG image expansion, the expansion circuit 9 uses the inverse DCT on the compressed data D2 to generate the expanded data D3. Occasionally, the expanded data D3 generated by the expansion circuit 9 contains mosquito noise caused by the filtered high-frequency components. The detection and removal circuit 16 removes mosquito noise in the expanded data D3 by executing a mosquito noise detection and removal process (hereinafter simply referred to as the "detection and removal process") described later to generate the noise-filtered data D4.

Figure 5:
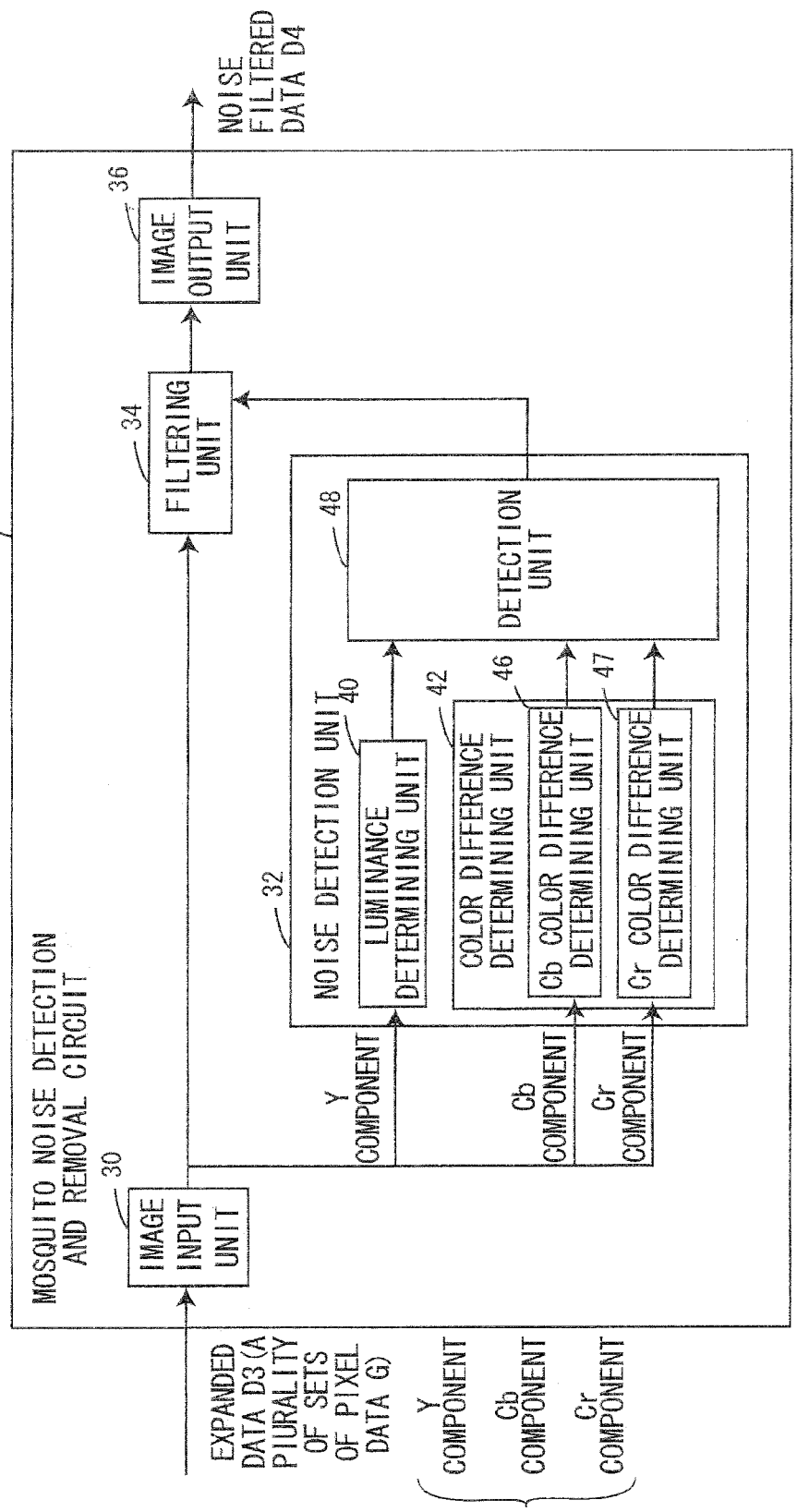
FIG. 5 is a system diagram illustrating a general structure of a detection and removal circuit.

FIG. 5 shows the general structure of the detection and removal circuit 16. The detection and removal circuit 16 includes an image input unit 30, a noise detection unit 32, a noise filtering unit 34, and an image output unit 36. The noise detection unit 32 further includes a luminance determining unit 40, a color-difference determining unit 42, and a detection unit 48. The color-difference determining unit 42 has both a Cb color-difference determining unit 46 and a Cr color-difference determining unit 47. The image input unit 30 inputs the expanded data D3 generated by the expansion circuit 9. The noise detection unit 32 detects if the expanded data D3 contains mosquito noise. When the expanded data D3 includes mosquito noise, the noise filtering unit 34 removes the mosquito noise and generates the noise-filtered data D4. The image output unit 36 outputs the noise-filtered data D4.

2. Mosquito Noise Detection and Removal Process

Next, the detection and removal process will be described with reference to FIGS. 6 through 8.

Figure 6:
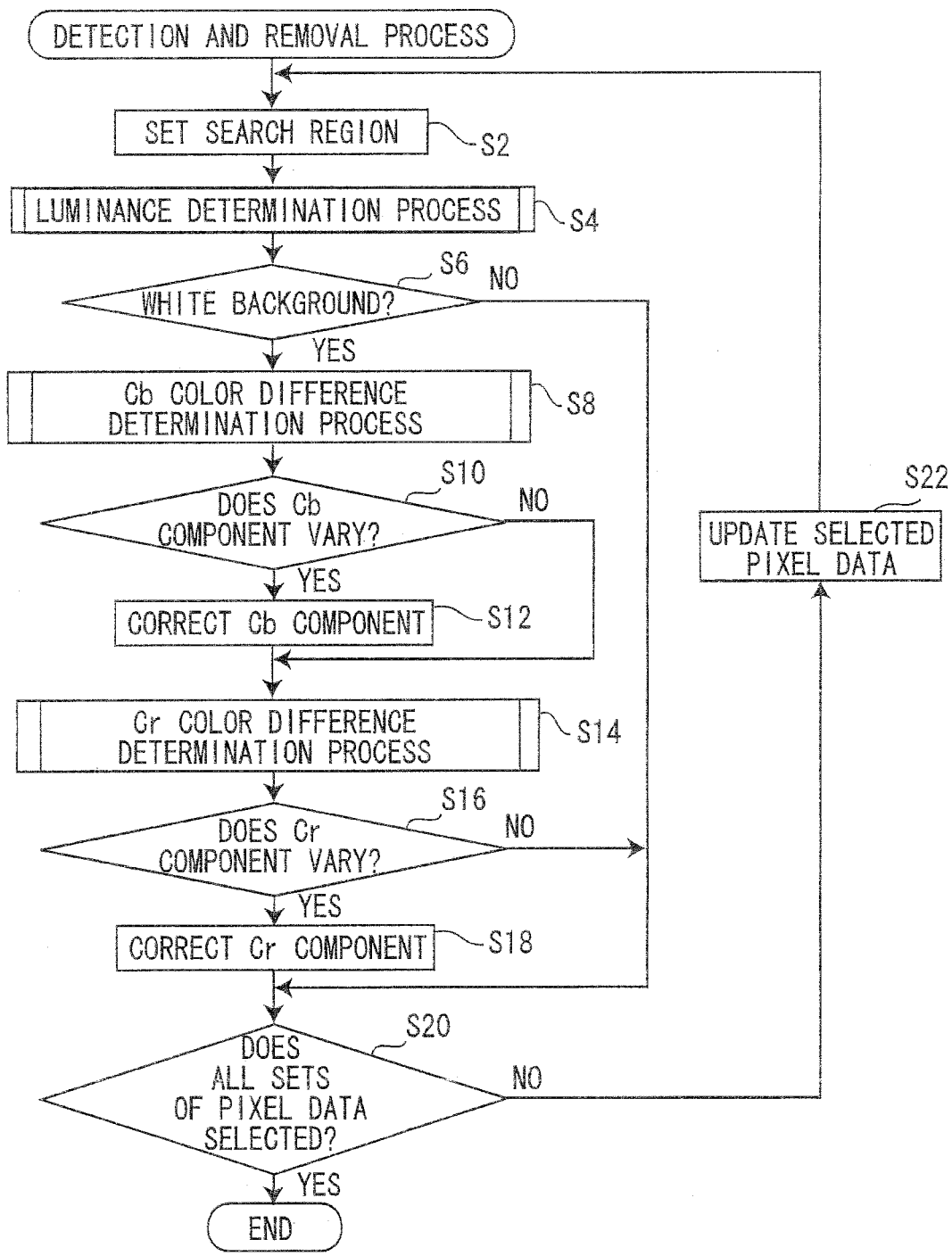
FIG. 6 is a flowchart illustrating steps in a detection and removal process executed by the detection and removal circuit.

FIG. 6 is a flowchart illustrating steps in the detection and removal process executed by the detection and removal circuit 16. The detection and removal circuit 16 begins the process when expanded data D3 generated by the expansion circuit 9 is inputted into the image input unit 30.

In S2 at the beginning of the detection and removal process, the noise detection unit 32 of the detection and removal circuit 16 selects one unit of pixel data G corresponding to one pixel from all pixel data G included in the expanded data D3, sets this selected unit of pixel data G as a selected pixel data SG, and sets the sets of pixel data G for a 5×5 pixels centered on the selected pixel data SG as a search region TH. The search region TH is set smaller than the block (8×8 pixels in the embodiment) treated in JPEG compression and expansion. After the search region TH has been set, in S4 the luminance determining unit 40 of the noise detection unit 32 executes a luminance determination process.

Luminance Determination Process

Figure 7:
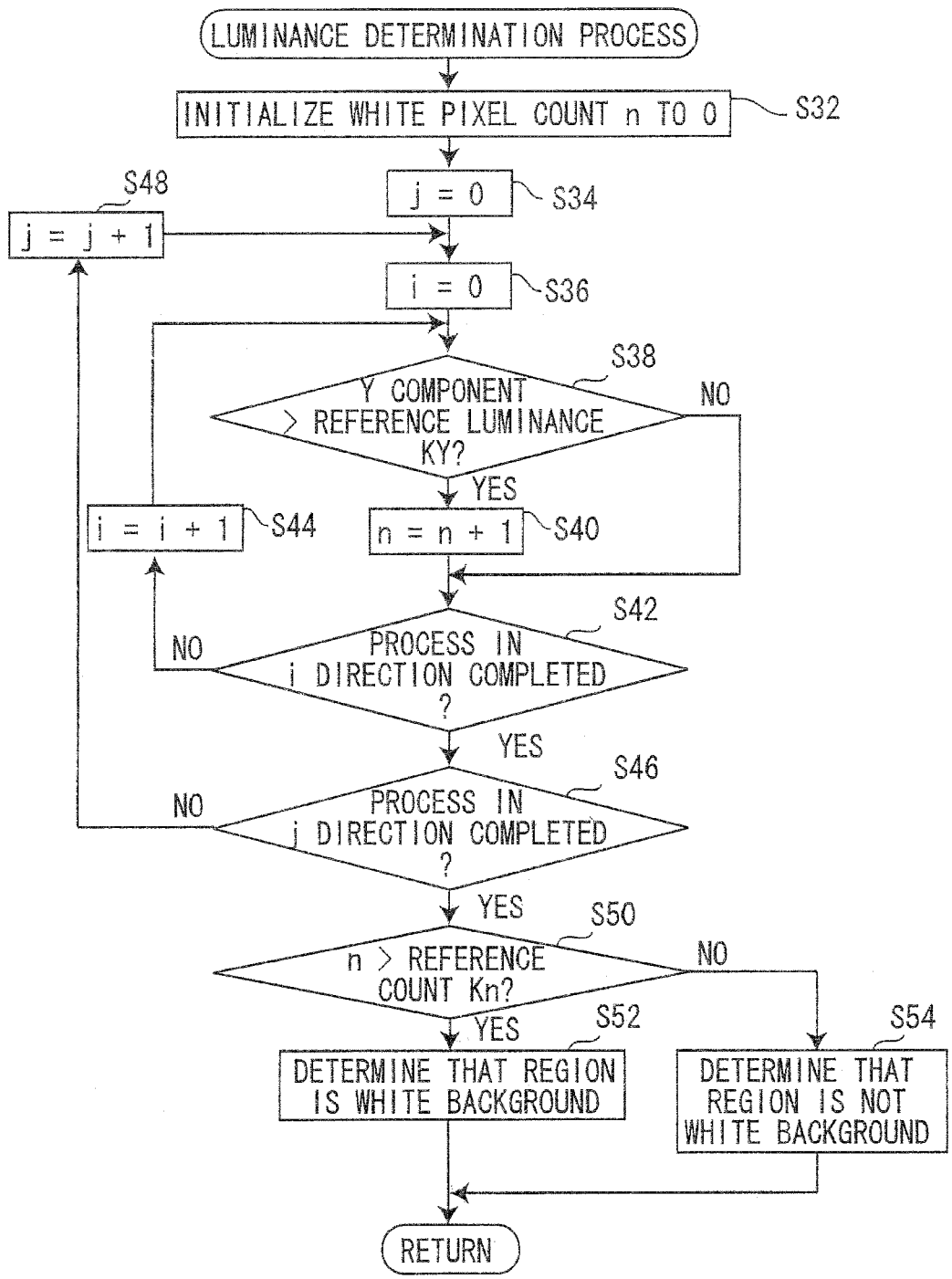
FIG. 7 is a flowchart illustrating steps in a luminance determination process.

FIG. 7 is a flowchart illustrating steps in the luminance determination process. In the luminance determination process, as well as a color-difference determination process described later, the luminance determining unit 40 (or color-difference determining unit 42) selects pixel data G for one of the pixels included in the search region TH as a target pixel data TG and shifts the target pixel data TG to each pixel in the search region TH, as indicated by arrows 56 in FIG. 4, while performing a process for each target pixel data TG In the following description, (i, j) indicate the coordinates of the pixel represented by the target pixel data TG, where the i coordinate for pixels in the search region TH progresses in the sequence 0, 1, . . . , 4 in the i direction, while the j coordinate for pixels in the search region TH progresses in the sequence 0, 1, . . . , 4 in the j direction.

In S32 at the beginning of the luminance determination process, the luminance determining unit 40 initializes a white pixel count n to "0" (n=0) and in S34 and S36 respectively sets the coordinates i and j of the target pixel data TG to "0". In S38 the luminance determining unit 40 compares the Y component of the target pixel data TG to a reference luminance KY. If the Y component of the target pixel data TG is greater than the reference luminance KY (S38: YES), in S40 the luminance determining unit 40 increments the white pixel count n by "1". Hence, the white pixel count n denotes the number of pixels in the search region TH having pixel data G with a Y component greater than the reference luminance KY. However, if the Y component of the target pixel data TG is less than or equal to the reference luminance KY (S38: NO), the luminance determining unit 40 does not increment the white pixel count n.

In S42 the luminance determining unit 40 determines whether the above comparison has been performed for each pixel in the current row j, i.e., whether the i is now "4". If the process has not been completed for all pixels in the current row, i.e., if i is not "4" (S42: NO), in S44 the luminance determining unit 40 increments the i coordinate by "1" to advance the target pixel data TG one pixel in the direction i. Subsequently, the luminance determining unit 40 repeats the above process from S38. When the comparison has been completed for all pixels in the current row, i.e., when the i coordinate is "4" (S42: YES), then the luminance determining unit 40 advances to S46.

In S46 the luminance determining unit 40 determines whether the above process has been completed for all rows j in the target pixel data TG, i.e., whether coordinate j equals to "4". If the process has not been completed for all rows, i.e., if coordinate j does not equal to "4" (S46: NO), in S48 the luminance determining unit 40 increments coordinate j by "1" to advance the target pixel data TG to the next row. Subsequently, the luminance determining unit 40 repeats the process from S36. However, if the process has been completed for all rows j, i.e., if coordinate j is equal to "4" (S46: YES), the luminance determining unit 40 advances to S50.

Once the luminance determining unit 40 has completed the above process for all pixels in the search region TH (S42: YES, S46: YES), in S50 the luminance determining unit 40 compares the white pixel count n to a reference count Kn to determine whether the background color for the search region TH corresponding to the current selected pixel data SG is a white background. If the white pixel count n is greater than the reference count Kn (S50: YES), in S52 the luminance determining unit 40 determines that the search region TH is a white background and ends the luminance determination process. On the other hand, if the white pixel count n is less than or equal to the reference count Kn (S50: NO), in S54 the luminance determining unit 40 determines that the search region TH is not a white background, and subsequently ends the luminance determination process.

After completing the luminance determination process, as shown in FIG. 6, in S6 the detection unit 48 of the noise detection unit 32 determines whether the determination returned from the luminance determination process was a white background. If the determination was not a white background (S6: NO), the noise detection unit 32 ends the process for the current selected pixel data SG and advances to S20. However, if the noise detection unit 32 determines that the result of the luminance determination process was a white background (S6: YES), in S8-S18 the color-difference determining unit 42 of the noise detection unit 32 executes the color-difference determination process. The color-difference determining unit 42 executes the color-difference determination process separately for each color component. First, in S8 the Cb color-difference determining unit 46 of the color-difference determining unit 42 executes a Cb color-difference determination process.

Cb Color-Difference Determination Process

Figure 8:
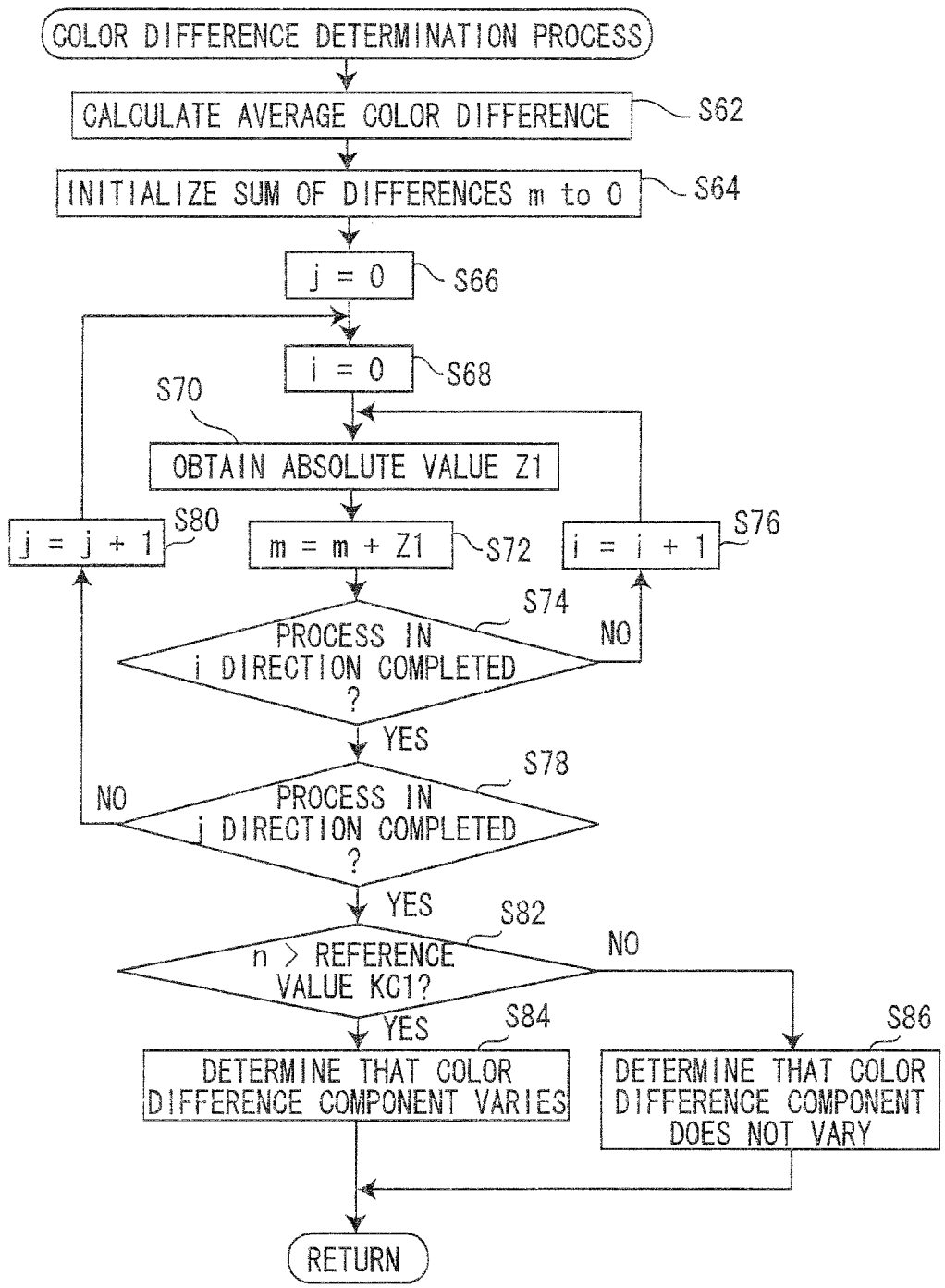
FIG. 8 is a flowchart illustrating steps in the color-difference determination process according to the first embodiment.

FIG. 8 is a flowchart illustrating steps in the color-difference determination process. In S62 at the beginning of the Cb color-difference determination process, the Cb color-difference determining unit 46 calculates an average color difference H by averaging the Cb components of the pixel data G for all pixels included in the search region TH. In S64 the Cb color-difference determining unit 46 initializes a sum of differences m to "0" (m=0) and in S66 and S68 respectively sets the coordinates i and j of the target pixel data TG to "0". In S70 the Cb color-difference determining unit 46 compares the Cb component of the target pixel data TG to the average color difference H and obtains an absolute value Z1 of the difference. That is, Z1 is an absolute of (the Cb component of the target pixel data TG—the average color difference H). In S72 the Cb color-difference determining unit 46 adds the absolute value Z1 calculated in S70 to the sum of differences m. Hence, the sum of differences m serves as the sum of absolute values Z1 in the search region TH.

In S74 the Cb color-difference determining unit 46 determines whether the above comparison has been performed for each pixel in the current row j, i.e., whether the i is now "4". If the process has not been completed for all pixels in the current row, i.e., if i is not "4" (S74: NO), in S76 the Cb color-difference determining unit 46 increments the i coordinate by "1" to advance the target pixel data TG one pixel in the direction i. Subsequently, the Cb color-difference determining unit 46 repeats the above process from S70. When the comparison has been completed for all pixels in the current row, i.e., when the i coordinate is "4" (S74: YES), then the Cb color-difference determining unit 46 advances to S78.

In S78 the Cb color-difference determining unit 46 determines whether the above process has been completed for all rows j in the search region TH, i.e., whether coordinate j equals "4". If the process has not been completed for all rows, i.e., if coordinate j does not equal "4" (S78: NO), in S80 the Cb color-difference determining unit 46 increments coordinate j by "1" to advance the target pixel data TG to the next row. Subsequently, the Cb color-difference determining unit 46 repeats the process from S68. However, if the process has been completed for all rows j, i.e., if coordinate j is equal to "4" (S78: YES), the Cb color-difference determining unit 46 advances to S82.

When the above process has been performed for each row in the search region TH (S74: YES, S78: YES), in S82 the Cb color-difference determining unit 46 compares the sum of differences m to a reference value KC1 to determine whether the Cb component in the search region TH for the current selected pixel data SG varies or not. If the sum of differences m is greater than the reference value KC1 (S82: YES), in S84 the Cb color-difference determining unit 46 determines that the Cb component varies in the search region TH and ends the Cb color-difference determination process. However, if the sum of differences m is less than or equal to the reference value KC1 (S82: NO), in S86 the Cb color-difference determining unit 46 determines that the Cb component does not vary in the search region TH, and subsequently ends the Cb color-difference determination process.

After completing the Cb color-difference determination process, as shown in FIG. 6, in S10 the detection unit 48 of the noise detection unit 32 determines whether the Cb component in the search region TH varies based on the results from the Cb color-difference determination process. The detection unit 48 detects mosquito noise in the current selected pixel data SG when determining that the background is white based on the luminance determination process (S6: YES) and that the Cb component varies based on the Cb color-difference determination process (S10: YES).

When variation in the Cb component is detected (S10: YES), in S12 the noise filtering unit 34 corrects the Cb component of the current selected pixel data SG that is determined in S10 to be irregular. Specifically, the noise filtering unit 34 changes the Cb component of the current selected pixel data SG to "0". Subsequently, the process advances to S14. When the detection unit 48 determines based on the Cb color-difference determination process that the Cb component does not vary (S10: NO), the process advances to S14.

Cr Color-Difference Determination Process

Next, the Cr color-difference determining unit 47 of the color-difference determining unit 42 executes a Cr color-difference determination process. Apart from using the Cr component in the pixel data G, the Cr color-difference determination process is identical to the Cb color-difference determination process. Thus, the description of this process will not be repeated. In the Cb color-difference determination process, the reference value KC1 may be set to the same value used in the Cr color-difference determination process or a different value.

After completing the Cr color-difference determination process, in S16 the detection unit 48 of the noise detection unit 32 determines whether the Cr component in the search region TH varies based on the results from the Cr color-difference determination process. The detection unit 48 detects mosquito noise in the current selected pixel data SG when determining that the background is white based on the luminance determination process (S6: YES) and that the Cr component varies based on the Cr color-difference determination process (S16: YES).

When variation in the Cr component is detected (S16: YES), in S18 the noise filtering unit 34 corrects the Cr component of the current selected pixel data SG that is determined in S16 to be irregular. Specifically, the noise filtering unit 34 changes the Cr component of the current selected pixel data SG to "0" and ends the process for the current selected pixel data SG. Subsequently, the process advances to S20. When the detection unit 48 determines based on the Cr color-difference determination process that the Cr component does not vary (S16: NO), the noise filtering unit 34 ends the process for the current selected pixel data SG, and the process advances to S20.

After completing the above process for the current selected pixel data SG, in S20 the noise detection unit 32 determines whether all pixel units worth of pixel data G included in the expanded data D3 have been selected as the selected pixel data SG. When there remains pixel data G that has not been selected (S20: NO), in S22 the noise detection unit 32 advances to the next pixel position, updates the selected pixel data SG, and repeats the process from S2. However, when all pixel data G has been processed (S20: YES), the noise detection unit 32 ends the detection and removal process. That is, the noise detection unit 32 selects pixel data G from the expanded data D3 for one pixel and sequentially moves from pixel to pixel in the i direction while shifting one pixel in the j direction after reaching the end of each row. When the pixel data G in the expanded data D3 for all pixels has been selected as the selected pixel data SG, the noise detection unit 32 determines that the current selected pixel data SG is the pixel data G for the pixel positioned at the end of both the i and j directions.

Effects of the Embodiment (1) In order to detect mosquito noise in the selected pixel data SG, the MFP 1 according to the embodiment determines whether the search region TH centered on the selected pixel data SG represents a white background and whether color difference components in the search region TH vary, but the MFP 1 does not determine whether the pixel data G in the search region TH includes pixel data G corresponding to an edge. Hence, pixel data G determined to have mosquito noise is not limited to image data present near pixel data G corresponding to an edge, as in the prior art. Therefore, the MFP 1 according to the embodiment can detect mosquito noise for pixel data G corresponding to regions separated from an edge, thereby detecting mosquito noise with greater accuracy.

(2) Upon detecting mosquito noise in the selected pixel data SG, the MFP 1 according to the embodiment executes a noise correction process on the color difference component subjected to the preceding process for determining variation. This configuration restricts the execution of a noise correction process on color difference components not determined to have variation in an earlier process and color difference components already subjected to a noise correction process in an earlier process, thereby reducing the time required for executing the noise correction process.

(3) The MFP 1 according to the embodiment determines whether there is variation in color difference components in the color-difference determination process for each of the two color difference components included in the pixel data G, and corrects the color difference components determined to have variation in the noise correction process. This configuration restricts the MFP 1 from performing correction on color difference component(s) not determined to have variation in the color-difference determination process, though the determination of variation is performed for each of the two color difference components in the pixel data G, thereby reducing the time required for noise correction.

(4) In the color-difference determination process, the MFP 1 according to the embodiment compares a number n of instances in which the pixel data G has a higher Y component than the reference luminance KY to determine whether the search region TH represents a white background. Generally, the Y component of pixel data G is inversely proportional to a density value indicating the darkness of the color represented by the pixel data G and, hence, the density is lower for pixel data G having a high Y component. Therefore, the number n of instances of pixel data G having a Y component greater than the reference luminance KY denotes the number n of instances of pixel data G having a density lower than a prescribed density. Thus, it is possible to determine from the number n of instances of pixel data G whether the background color in the search region TH is less than or equal to a fixed density, i.e., whether the search region TH represents a white background.

Since the MFP 1 of the embodiment determines whether the search region TH represents a white background based on the number n of instances of pixel data G having a greater Y component than the reference luminance KY, the process for determining whether the search region TH represents a white background is simplified.

(5) The MFP 1 according to the embodiment determines in the color-difference determination process whether there exists variation in the color difference components based on the sum m of absolute values Z1 of the differences between the color difference components of the pixel data G and the average color difference H of the color difference components. This configuration requires fewer calculations for determining whether there is variation in the color difference components than when the determination is made based on the sum of the factorials of the differences, for example.

(6) The MFP 1 according to the embodiment detects mosquito noise in a search region TH that is smaller than the block treated in JPEG compression and expansion. Using a smaller search region TH requires less time to detect mosquito noise than when using a search region TH the same size as the block.

Generally, there is still a possibility that mosquito noise will be generated in pixel data G included in a block, even when the block has no pixel data G that corresponds to an edge. Hence, if the search region TH is set smaller than the block and does not include pixel data G corresponding to an edge, the conventional technology cannot correct mosquito noise generated in pixel data G within the block but not included in the search region TH.

By setting the search region TH smaller than the block, the MFP 1 detects mosquito noise for each pixel data G included in the image data D while suppressing the time required for such detections, rather than detecting mosquito noise only for search regions TH that include pixel data G corresponding to edges. Accordingly, the MFP 1 can detect mosquito noise with greater accuracy.

Second Embodiment

Figure 9:
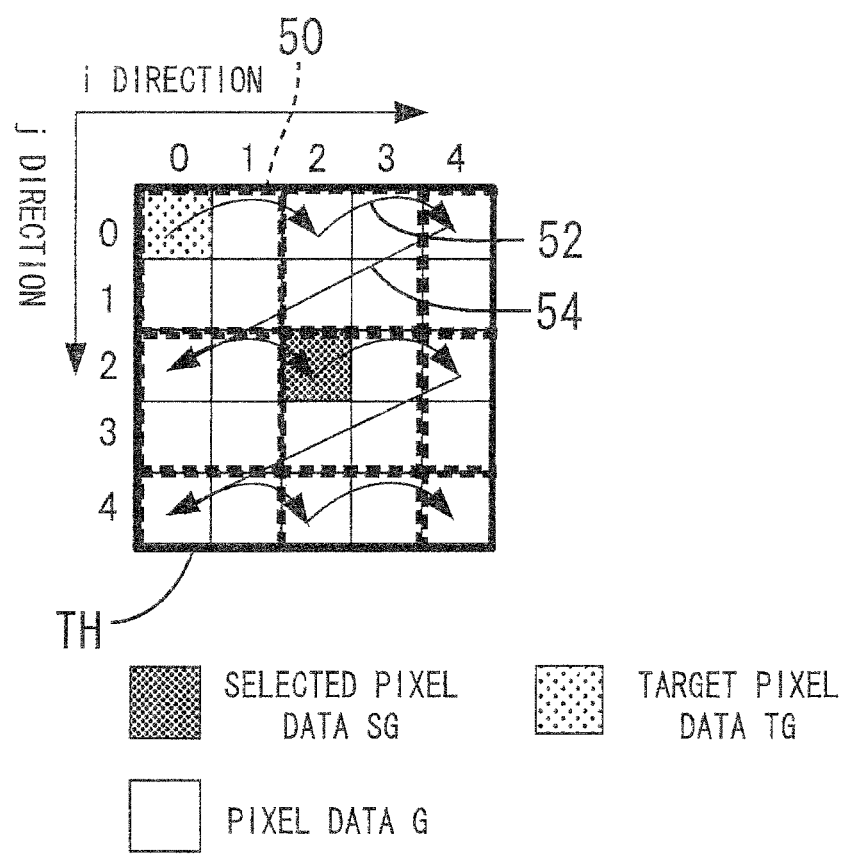
FIG. 9 is an explanatory diagram illustrating pixel data target for a color-difference determination process according to a second embodiment.

Next, a second embodiment of the present invention will be described with reference to FIGS. 9 and 10. The second embodiment differs from the first embodiment in the color-difference determination process. The second embodiment assumes a sampling factor (Y:Cb:Cr) of (4:2:0) expressing spatial sampling for each color component in which the color difference components are compressed to one-fourth the size of the luminance component. Specifically, in JPEG compression, the MFP 1 finds the average for each color difference component in pixel data G for the four pixels framed by dotted lines 50 in FIG. 9 and generates the compressed data D2 based on these averages. Accordingly, the pixel data G for the four pixels surrounded by the dotted lines 50 have the same color difference components when the compressed data D2 is expanded into the expanded data D3. Details in the following description that are identical to the description in the first embodiment have been omitted to avoid duplicating description.

1. Cb Color-Difference Determination Process

Figure 10:
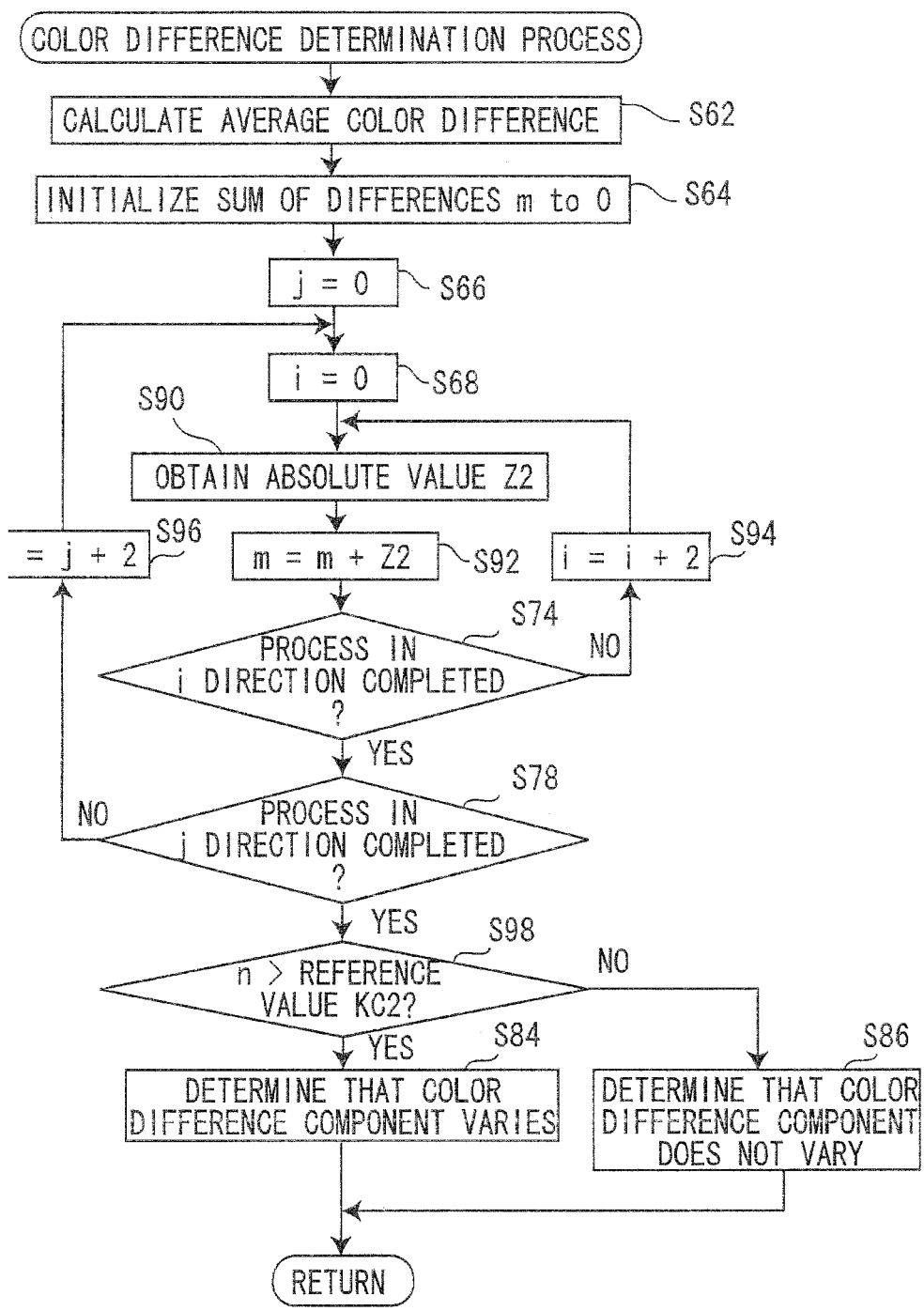
FIG. 10 is a flowchart illustrating steps in the color-difference determination process according to the second embodiment.

FIG. 10 is a flowchart illustrating steps in the color-difference determination process according to the second embodiment. In S62 at the beginning of the Cb color-difference determination process, the Cb color-difference determining unit 46 calculates the average color difference H of Cb components for all pixel data G included in the search region TH. In S64 the Cb color-difference determining unit 46 initializes the sum of differences m to "0" (m=0) and in S66 and S68 respectively sets the coordinates i and j of the target pixel data TG to "0". In S90 the Cb color-difference determining unit 46 compares the Cb component of the target pixel data TG to the average color difference H and obtains a square Z2 of the difference. In S92 the Cb color-difference determining unit 46 adds the square Z2 calculated in S90 to the sum of differences m. Hence, the sum of differences m serves as the sum of squares Z2 in the search region TH.

In S74 the Cb color-difference determining unit 46 determines whether the above comparison has been completed for the current row j, i.e., whether the i is now "4". If the process has not been completed for the current row, i.e., if i is not "4" (S74: NO), in S94 the Cb color-difference determining unit 46 increments the i coordinate by "2" to advance the target pixel data TG two pixels in the direction i, as indicated by arrows 52. Subsequently, the Cb color-difference determining unit 46 repeats the above process from S90. When the comparison has been completed for the current row, i.e., when the i coordinate is "4" (S74: YES), then the Cb color-difference determining unit 46 advances to S78.

In S78 the Cb color-difference determining unit 46 determines whether the above process has been completed with respect to the direction j in the search region TH, i.e., whether the coordinate j equals "4". If the process has not been completed with respect to the direction j, i.e., if coordinate j does not equal "4" (S78: NO), in S96 the Cb color-difference determining unit 46 increments coordinate j by "2" to advance the target pixel data TG two rows, as indicated by arrows 54. Subsequently, the Cb color-difference determining unit 46 repeats the process from S68. When the process has been completed with respect to the direction j, i.e., if coordinate j is equal to "4" (S78: YES), the Cb color-difference determining unit 46 advances to S98.

When the above process has been performed in the search region TH with respect to the directions i and j (S74: YES, S78: YES), in S98 the Cb color-difference determining unit 46 compares the sum of differences m to a reference value KC2 to determine whether the Cb component in the search region TH for the current selected pixel data SG varies. If the sum of differences m is greater than the reference value KC2 (S98: YES), in S84 the Cb color-difference determining unit 46 determines that the Cb component varies in the search region TH, and ends the Cb color-difference determination process. However, if the sum of differences m is less than or equal to the reference value KC2 (S98: NO), in S86 the Cb color-difference determining unit 46 determines that the Cb component does not vary in the search region TH, and subsequently ends the Cb color-difference determination process. Apart from using the Cr component in the pixel data G, the Cr color-difference determination process in the second embodiment is identical to the Cb color-difference determination process.

2. Effects of the Second Embodiment (1) In the MFP 1 according to the second embodiment, the color difference components are compressed to one-fourth the size of the luminance component by setting the color difference components in the G to the same value for each of the sets of four pixels framed by the dotted lines 50 in FIG. 9. By using this feature of the color difference components, the MFP 1 simplifies the color-difference determination process. In other words, the MFP 1 treats the color difference components in the pixel data G as the same for each of the four pixels arranged 2×2 in the i and j directions and shifts the target pixel data TG by two pixels when advancing the target pixel data TG in either the i direction or the j direction. Hence, the MFP 1 according to the second embodiment requires fewer computations for the color-difference determination process than the MFP 1 according to the first embodiment that advances the target pixel data TG one pixel at a time.

(2) The MFP 1 according to the second embodiment determines in the color-difference determination process whether there exists variation in the color difference components based on the sum m of squares Z2 of the differences between the respective color difference components in the pixel data G and the average color difference H of the color difference components. This configuration can determine variation in color difference components more accurately than when the determination is based on the sum of absolute values of the differences, for example.

Variations of the Embodiments

While the invention has been described in detail with reference to the embodiment thereof, it would be apparent to those skilled in the art that various changes and modifications may be made therein without departing from the scope of the invention.

(1) A MFP 1 having both a scanner function and a printer function serves as the image processing device in the, but the present invention may also be applied to a device possessing at least one of a printer function, a scanner function, a copier function, and a facsimile function, for example.

(2) The invention may also be applied to devices that possess none of the above functions, such as a device that executes a detection and removal process on expanded data D3, which was compressed and expanded according to the JPEG format by another device and stored in USB memory. The USB interface 24 is another example of an input unit. Further, the present invention may be applied to a device that uses the expansion circuit 9 to expand compressed data D2 stored in the RAM 13 into expanded data D3 and to execute the detection and removal process on the expanded data D3 after another device has generated the compressed data D2 according to JPEG compression and stored in the compressed data D2 in the RAM 13 via the USB interface 24.

(3) In the embodiments, the control unit of the invention is described as the component set 19, which includes the CPU 11, ROM 12, RAM 13, and image-processing circuit 17. However, the control unit may be configured of discrete CPU, ASIC, and other dedicated devices that execute various processes.

(4) Programs executed by the CPU 11 need not be stored in the ROM 12, but may be stored in the CPU 11 itself or in another storage device.

(5) In the embodiments, the Cb and Cr components are used as the examples of color difference components in the pixel data G, but the present invention may be applied to pixel data G possessing color difference components of another type, such as Pb and Pr components.

(6) While the second embodiment describes a configuration for compressing color difference components to one-fourth the size of the luminance components with the sampling factor (4:2:0), it is conceivable to compress the color difference components to one-half the luminance component, as in the sampling factor (4:2:2), for example. In this case, the target pixel data TG is only shifted by two pixels in the i direction when performing the color-difference determination process. That is, the target pixel data TC is shifted by two pixel in the i direction and by one pixel in the j direction. This configuration requires fewer computations for determining variation in the color different components than when the target pixel data TG is advanced by one pixel in the i direction.

(7) The embodiments use JPEG compression and expansion as the format for compressing and expanding the image data D. However, any compression/expansion format that includes an irreversible process (lossy compression) and requires the detection and removal process may be used in the compression and expansion processes.

(8) In the luminance determination process of the embodiments described above, the white pixel count n is set to the instances of pixel data G in the search region TH having a Y component greater than the reference luminance KY, and the MFP 1 determines whether the search region TH represents a white background by comparing the white pixel count n to a reference count Kn, but the determination condition for a white background is not limited to this condition. For example, the MFP 1 may calculate an average luminance H of Y components in all pixel data G in the search region TH and may determine that the search region TH represents a white background by comparing the average luminance H to the reference luminance KY.

(9) The MFP 1 according to the embodiments executes a color-difference determination process for each of the two color difference components in the pixel data G, but it is not essential to execute this color-difference determination process for both color difference components. That is, the MFP 1 may detect mosquito noise by executing the color-difference determination process on only one of the color difference components and may perform the noise correction process only on the color difference component subjected to the color-difference determination process.

(10) In the first embodiment, in S72 the sum of differences m is obtained by summing of each of the absolute values Z1. In S82 the sum of differences m is used to determine whether the color difference component in the search region TH varies. On the other hand, in the second embodiment, in S92 the sum of differences m is obtained by summing each of the square differences Z2. In S98 the sum of differences m is used to determine whether the color difference component in the search region TH varies. However, in S72 of the first embodiment the sum of differences m may be obtained by summing each of the square differences Z2. Further, in S92 of the second embodiment, the sum of differences m may be obtained by summing each of the absolute values Z1.

What is claimed is:

1. An image processing device comprising:
an input portion configured to input image data expanded from compressed image data, the image data representing an image having a plurality of pixels, the image data including a plurality of sets of pixel data corresponding the plurality of pixels, each of the plurality of sets of pixel data including a color difference component and a luminance component; and
a processor configured to perform:
(a) setting, as target pixel data, each set of pixel data from among the plurality of sets of pixel data;
(b) selecting, from among the plurality of sets of pixel data, a plurality of first sets of pixel data corresponding to a plurality of first pixels positioned within a prescribed range of the image, the prescribed range including a pixel corresponding to the target pixel data;
(c) determining whether the plurality of first sets of pixel data represents a white background having a density lower than a prescribed density by at least one luminance component of the plurality of first sets of pixel data;

(d) determining whether a variation in color difference components among the plurality of first sets of pixel data satisfies a prescribed condition; and (e) determining that target pixel data includes mosquito noise when the plurality of first sets of pixel data represents the white background and when the variation in the color difference component among the plurality of first sets of pixel data satisfies the prescribed condition.

2. The image processing device according to claim 1, wherein the color difference component includes a first color difference component and a second color difference component and one luminance component, wherein the determining (d) determines whether the variation in at least one of the first and second color difference components among the plurality of first sets of pixel data satisfies the prescribed condition.

3. The image processing device according to claim 2, wherein the processor is configured to further perform (f) correcting the color difference component of the target pixel data when the determining (e) determines that the target pixel data includes the mosquito noise.

4. The image processing device according to claim 3, wherein the determining (d) includes:

(d-1) determining whether the variation in the first color difference components among the plurality of first sets of pixel data satisfies a first prescribed condition; and (d-2) determining whether the variation in the second color difference components among the plurality of first sets of pixel data satisfies a second prescribed condition, wherein the correcting (f) includes:

(f-1) correcting the first color difference component of the target pixel data when the determining (d-1) determines that the variation in the first color difference components among the plurality of first sets of pixel data satisfies the first prescribed condition; and (f-2) correcting the second color difference component of the target pixel data when the determining (d-2) determines that the variation in the second color difference components of the plurality of first sets of pixel data satisfies the second prescribed condition.

5. The image processing device according to claim 1, wherein each of the plurality of sets of pixel data further includes a luminance component, wherein the determining (c) includes:

(c-1) determining whether the luminance component of each of the plurality of first sets of pixel data larger than a reference luminance;

(c-2) counting number of sets of pixel data whose luminance component is larger than the reference luminance; and (c-3) determining that the plurality of first sets of pixel data represents the white background when the number is larger than a reference number.

6. The image processing device according to claim 1, wherein the determining (d) includes:

(d-3) calculating: an average of the color difference component of the plurality of first sets of pixel data; a difference between the average and the color difference component of each of the plurality of first sets of pixel data; and a sum of the absolute value of the difference among the plurality of first sets of pixel data; and (d-4) determining whether the variation in color difference components among the plurality of first sets of pixel data satisfies the prescribed condition based on the sum.

7. The image processing device according to claim 1, wherein the determining (d) includes:

(d-5) calculating: an average of the color difference component of the plurality of first sets of pixel data; a difference between the average and the color difference component of each of the second sets of pixel data; and a square sum of the difference among the plurality of first sets of pixel data; and (d-6) determining whether the variation in color difference components of the plurality of first sets of pixel data satisfies the prescribed condition based on the square sum.

8. The image processing device according to claim 1, further comprising an expansion portion configured to generate the image data by expanding the compressed image data, wherein each of the plurality of sets of pixel data further includes a luminance component, wherein the input portion inputs the image data generated by the expansion portion, wherein the compressed image data includes a first compression rate of the luminance component and a second compression rate of the color difference component, the second compression rate being set larger than the first compression rate, wherein the determining (d) includes:

(d-7) setting a plurality of second sets of pixel data by reducing at least one set of pixel data from the plurality of first sets of pixel data based on a ratio of the first compression rate to the second compression rate;

(d-8) calculating: an average of the color difference component among the plurality of first sets of pixel data; a difference between the average and the color difference component of each of the plurality of second sets of pixel data; and a square sum of the absolute value of the difference among the plurality of second sets of pixel data; and (d-9) determining whether the variation in color difference components of the plurality of first sets of pixel data satisfies the prescribed condition based on the square sum.

9. The image processing device according to claim 2, wherein the first color difference component includes a Cb component, and the second color difference component includes a Cr component.

10. The image processing device according to claim 5, wherein a luminance component includes a Y component.

11. The image processing device according to claim 1, wherein the compressed image data is generated from original image data corresponding to an original image, the original image data including a plurality of sets of original pixel data corresponding to a plurality of pixels in the original image, wherein the compressed image data includes a jpeg compressed image data generated by using a discrete cosine transform that processes, as a unit, a plurality of sets of original pixel data corresponding to a plurality of sets of original pixels in a prescribed transform range of the original image, the image processing device further comprising an expansion portion configured to generate the image data by expanding the compressed image data, wherein the input portion inputs the image data generated by the expansion portion, wherein the prescribed range is smaller than the prescribed transform range.

* * * * *